(12) United States Patent
Tharp et al.

(10) Patent No.: US 6,770,200 B2
(45) Date of Patent: Aug. 3, 2004

(54) METHOD AND APPARATUS FOR ENHANCING WASTEWATER TREATMENT IN LAGOONS

(75) Inventors: Charles E. Tharp, Columbia, MO (US); Randall C. Chann, Columbia, MO (US)

(73) Assignee: Environmental Dynamics, Inc., Columbia, MO (US)

( * ) Notice: Subject to any disclaimer, the term of this patent is extended or adjusted under 35 U.S.C. 154(b) by 5 days.

(21) Appl. No.: 10/237,305

(22) Filed: Sep. 9, 2002

(65) Prior Publication Data

US 2004/0045901 A1 Mar. 11, 2004

(51) Int. Cl.[7] ............................................... C02F 3/00
(52) U.S. Cl. ..................................... 210/626; 210/803
(58) Field of Search ............................... 210/620–628, 210/629, 800, 803

(56) References Cited

U.S. PATENT DOCUMENTS 5,384,049 A * 1/1995 Murphy ...................... 210/629
5,534,141 A   7/1996 McAnaney et al.
6,372,140 B2 * 4/2002 Kelly ......................... 210/629

* cited by examiner

Primary Examiner—Chester T. Barry
(74) Attorney, Agent, or Firm—Shook, Hardy & Bacon L.L.P.

(57) ABSTRACT

A method and apparatus for building a lagoon based advanced treatment system or upgrading an existing lagoon system for advanced treatment of wastewater. The lagoon is provided with a baffle to create a complete mix zone in which an aeration system and bioconcentration modules are installed. Biological solids are concentrated in the modules and drop through their open bottoms where the solids are recirculated and mixed by the aeration system. Once a biomass equilibrium is reached in the complete mix zone, excess solids are passed into the rest of the lagoon for standard treatment there. The complete mix zone is operated as a low rate activated sludge process with a detention time much less than for the rest of the lagoon, maintaining sufficient heat and sludge aging to effect complete biological nitrification and/or denitrification.

14 Claims, 2 Drawing Sheets

METHOD AND APPARATUS FOR ENHANCING WASTEWATER TREATMENT IN LAGOONS

FIELD OF THE INVENTION

This invention relates in general to the treatment of wastewater and deals more particularly with a method and apparatus for use in a new lagoon or basin or for upgrading existing lagoon systems in a manner to enhance the wastewater treatment.

BACKGROUND OF THE INVENTION

Lagoon systems for treatment of wastewater have long been in use and have achieved considerable popularity, especially in areas where land is readily available. A lagoon system typically involves use of an earthen basin in which the wastewater is contained. The organic wastes are converted to biological solids, either by operating the system as a simple stabilization pond or by using low rate partial mix aeration. The biological solids eventually settle and are retained on the bottom of the lagoon.

Aerated lagoon systems are simple and economically advantageous because expensive equipment is not required and there is no need for highly trained personnel to operate the facility. However, substantial amounts of land are required because of the need to detain the wastewater in the lagoon for an extended period to achieve significant levels of treatment. Also, the overall capacity or treatment level is limited, as virtually no flexibility is available in the treatment process.

By way of example, a typical lagoon system may require 15 to 30 days detention time to remove most carbonaceous BOD and oxidize ammonia during warm weather. In the upper midwest and other relatively cold climates, the lagoon temperature in the winter is too cold for nitrification to be carried out. With the increased emphasis that is being placed on the nitrification of ammonia, and with regulatory requirements being gradually expanded to require nitrification for all systems, the basic lagoon technology is severely handicapped due to its inability to consistently nitrify ammonia, particularly in cold climates. Many small municipalities have significant investment in an existing lagoon system and lack the financial capability to construct more advanced treatment facilities such as an activated sludge plant that is capable of meeting the regulatory requirements for nitrification and/or denitrification. Further, the costs of training operating personnel and maintaining more sophisticated systems are often beyond the capability of rural water districts and small municipalities.

SUMMARY OF THE INVENTION

The present invention is directed to a method and apparatus for treating wastewater that makes use of a new or existing lagoon facility and involves operating the lagoon in a manner to treat wastewater using more advanced techniques that allow nitrification and/or denitrification.

In accordance with the invention, the performance of a new or existing lagoon system is enhanced by providing baffles or added earthen berms that create a complete mix bioreactor zone at the front end of the basin or lagoon, or elsewhere if desired. The complete mix zone is operated using a low rate activated sludge process that involves complete mixing of the wastewater using only a small portion of the existing lagoon with a much shorter detention time than the original lagoon, or a shorter detention time than typical lagoon practice in the case of a new lagoon application.

A suitable aeration system is installed in the complete mix zone and may include floating air supply laterals from which air diffusers are suspended near the bottom of the lagoon. This type of aeration system can be installed without requiring de-watering of the basin and can accommodate uneven basin floors. Also installed in the complete mix zone is one or more bioconcentration modules which are preferably suspended from the floating air laterals or from floats or in another fashion. The bioconcentration modules do not function as clarifiers but instead provide settling chambers that are open at the top and bottom. The bioconcentration modules are internal to the bioreactor zone where aeration and mixing occur. Solids are concentrated in the bioconcentration chambers and drop by gravity out through the bottom of the settling chamber, thus returning them into the active bioreactor zone. This automatic return of solids maintains sufficient bacteria in the complete mix bioreactor zone to sustain a relatively high rate of biological activity. The solids are returned and are remixed in the complete mix zone by the aeration system and are circulated throughout the zone to maintain the proper active biomass for a complete mix process in the bioreactor zone.

Biomass concentrations in the bioreactor zone increase after start up with a very large percentage of all solids returned by the bioconcentration module at first (i.e., only a small amount of solids initially escape over the weir or other device used to control the discharge from the module). Continued operation of the system results in an increased level of biomass in the bioreactor zone until an equilibrium state of solids growth and return is reached, at which time escape of solids over the weir or other control device is higher.

Biomass equilibrium is thus achieved in the complete mix zone, and excess solids then simply pass into the rest of the lagoon where they eventually settle and are subject to the normal lagoon treatment process. In most systems, the detention time in the complete mix zone is 1–2 days as compared to 15–30 days in the original lagoon operated conventionally. When biological equilibrium is reached, the MLSS level is typically 1000 mg/l to 5000 mg/l. in the bioreactor zone.

The complete mix zone is typically operated as a low rate activated sludge process with an F/M ratio between 0.05 and 0.30. The system normally operates with a sludge age between 40 and 50 days. Sufficient sludge age is provided to effect complete nitrification because heat is conserved and maintained even in cold weather conditions. The relatively short detention time of 1–2 days maintains the temperature in the complete mix bioreactor zone high enough to accommodate biological nitrification.

Rather than monitoring and managing the sludge concentrations with separate clarifiers and controlled sludge recirculation, as occurs in extended aeration, conventional, or high rate activated sludge processes, the complete mix zone is simply allowed to reach a natural biomass equilibrium condition. Biomass from the bioconcentration modules is retained in the complete mix bioreactor zone. Excess solids from the system are discharged into the second or polishing lagoon with the bioreactor effluent where they are subjected to stabilization pond treatment with or without aeration.

The benefits achieved by the present invention are significant both economically and because of the enhanced wastewater treatment. The cost of upgrading an existing lagoon or constructing a new lagoon with advanced treatment is modest because use can be made of the existing basins, existing pumping and hydraulics, existing sludge disposal, a baffle, an aeration system, and the necessary settling modules as the primary upgrade modules. The treatment flexibility and capability are improved markedly in the upgrade because there is a high degree of carbonaceous and BOD removal and nitrification can be effected as well as denitrification as an option. Because biomass equilibrium is reached naturally in the mixed bioreactor zone using the bioconcentration modules, a wide range of effluents and a wide range of design conditions can be accommodated. At the same time, the basic simplicity of the lagoon system is retained and there is no need for a major increase in the training level or technical abilities of operating personnel.

Other and further objects of the invention, together with the features of novelty appurtenant thereto, will appear in the course of the following description.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
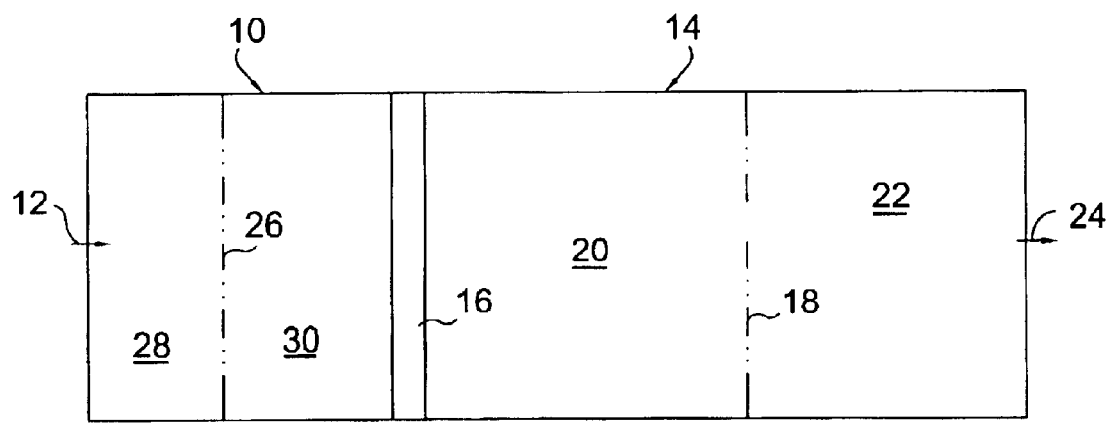
FIG. 1 is a schematic diagram of a wastewater treatment process carried out in accordance with a preferred embodiment of the present invention.

Referring now to the drawings in more detail, the present invention is directed to an enhancement to a conventional lagoon wastewater treatment system. Referring initially to FIG. 1, numeral 10 generally designates a basin or lagoon into which wastewater influent is directed, as indicated by the directional arrow 12. Another earthen basin 14 is located adjacent to and downstream from basin 10 and may be separated from basin 10 by an earthen berm 16 or similar structure. The basin 14 may be partitioned by a baffle 18 into two separate zones 20 and 22 which may be subject to conventional lagoon treatment processes such as a stabilization pond operation or partial mix aeration. The effluent is discharged from zone 22, as indicated by the directional arrow 24.

In accordance with the present invention, the first basin 10 is partitioned by an earthen berm or baffle 26 into two different zones. The first zone 28 at the front end of the treatment system is a complete mix zone in which a low rate activated sludge process is carried out. The other zone 30 is located downstream from the complete mix zone 28 and may be operated as a stabilization pond or as an extended aeration or partial mix basin. The complete mix zone 28 is considerably smaller than the remaining zones 30, 20 and 22 and is operated in a different fashion.

Figure 3:
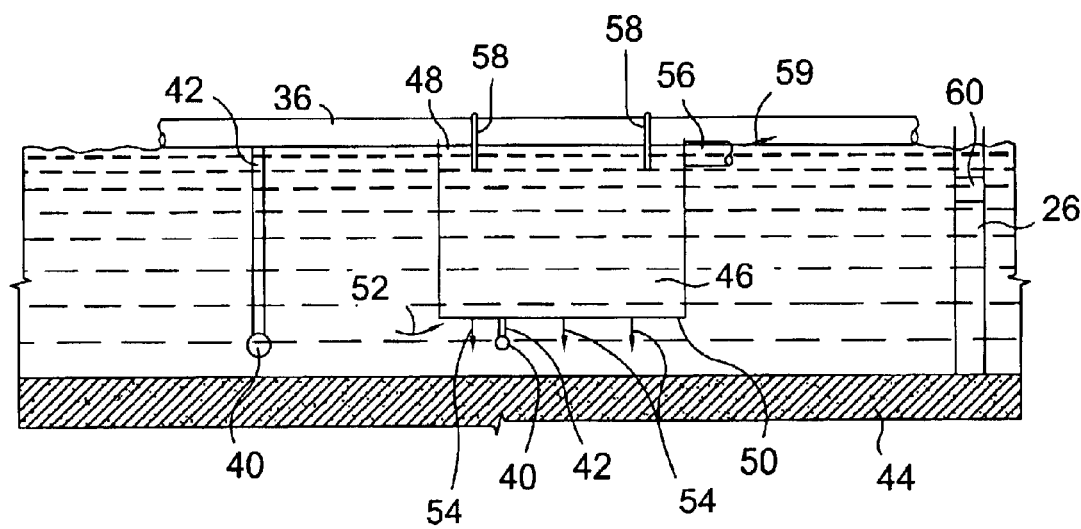
FIG. 3 is a fragmentary sectional view on an enlarged scale taken generally along line 3—3 of FIG. 2 in the direction of the arrows.
Figure 2:
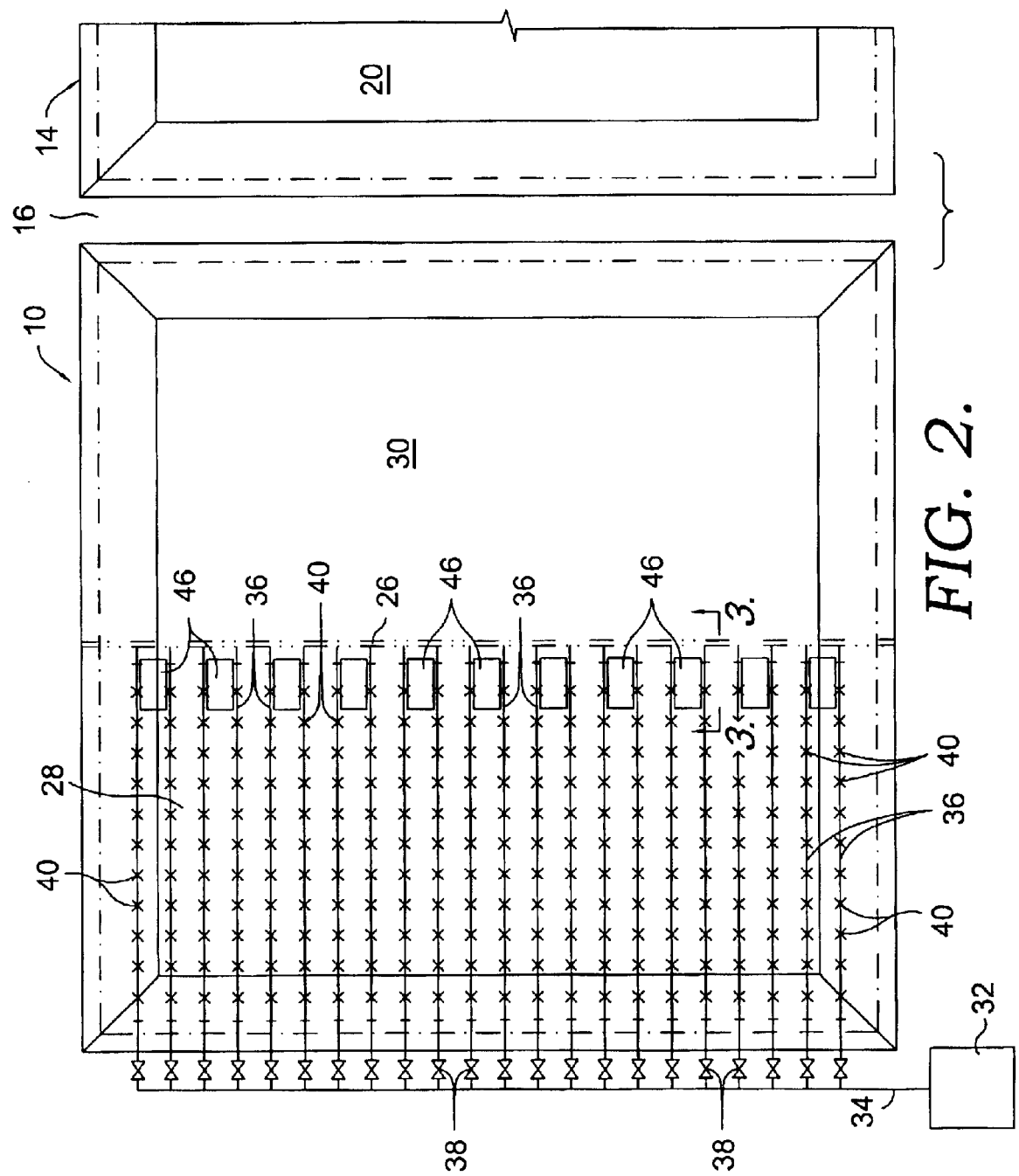
FIG. 2 is a diagrammatic top plan view of a lagoon wastewater treatment system that is upgraded to carry out a treatment process in accordance with a preferred embodiment of the present invention.

With additional reference to FIG. 2 in particular, the complete mix zone 28 is equipped with an aeration system that may include a conventional blower 32 supplying air to a header pipe 34 that extends along the front end of basin 10. The header pipe 34 may connect with a plurality of floating air supply laterals 36, preferably through suitable valves 38. As shown in FIG. 3, each of the laterals 36 floats on the surface of the wastewater contained in the complete mix zone 28. With continued reference to FIG. 3 in particular, a plurality of tubular air diffusers 40 are suspended from each of the floating laterals 36. A flexible hose 42 extends downwardly from lateral 36 and connects at its lower end with the diffuser 40 in order to suspend the diffuser above the basin floor 44 and also to supply air to the diffuser from the lateral 36. The diffusers 40 are located near but above the basin floor 44.

While surface aeration, fixed grid aeration, submerged laterals, or other types of aeration systems can be used, an aeration system that makes use of floating air supply laterals and suspended fine bubble diffusers is preferred, especially with an existing lagoon or basin, as it can be installed without the need to de-water the basin 10 of the existing lagoon system. In addition, the fine bubble aerators 40 operate efficiently for mixing and transfer of air to the wastewater that is undergoing treatment. It should be understood that the air laterals 36 can be arranged to extend perpendicular to the direction of flow or in other patterns as alternatives to the arrangement shown in FIG. 2.

As shown in FIG. 2, there may be a number of laterals 36 extending to a location adjacent to the baffle 26, and each lateral 36 is provided with a number of the diffusers 40 which are typically spaced apart uniformly throughout the complete mix zone 28. However, virtually any number of supply laterals and any number and type of diffusers can be installed in the complete mix zone 28. It is necessary for the aeration system to be capable of continuously or intermittently mixing the wastewater completely in the complete mix zone 28 along with the solids retained from the bioconcentration modules in order to achieve the benefits of the present invention.

Many or all of the floating air laterals 36 can be equipped with a bioconcentration module 46 which may be located near the baffle 26 or at other strategic locations to optimize the biological process. Each bioconcentration module 46 is preferably a rectangular structure that provides a stilling well effect and a bioconcentration chamber inside of it. As best shown in FIG. 3, each module 46 has an open top 48 and is supported by the floating laterals 36 or by an integral float structure as part of the module. Wastewater is admitted to the bioconcentration chamber from its open bottom 50, as indicated by the directional arrow 52. Solids drop out of the bioconcentration chamber through its bottom 50 after they have been concentrated within the bioconcentration chamber, as indicated by the directional arrows 54. Each module 46 may be provided with a weir 56 or other discharge device from which effluent discharges from the settling chamber. Each module 46 is preferably spaced above the basin floor 44 and may be provided with a float structure in order to maintain its position. Preferably, each module 46 is suspended from a corresponding air lateral 36, as by means of straps 58 or any other suitable tethering device.

Weirs, decanters or other collection devices may be provided at the tops of the bioconcentration modules 46 to remove effluent liquid and excess biosolids from the complete mix zone to the settling/stabilization zone. The top of the module 46 is preferable above the liquid level with the weir 56 or other discharge device extending downstream at a location near the liquid level to direct effluent and excess solids out of the bioconcentration chamber as indicated by the directional arrow 59 in FIG. 3.

As shown in FIG. 3, baffle 26 may have one or more passages 60 to accommodate the flow of material from the complete mix zone 28 into the succeeding zone 30. An option is to install individual control values for each passage.

In accordance with the present invention, the complete mix zone 28 can be newly constructed or created in an existing lagoon system in order to upgrade the capabilities of the lagoon system for treating wastewater and particularly for effecting advanced treatment levels of biological nitrification of ammonia and/or biological denitrification. The baffle 26 is installed in basin 10, and the aeration system and settling modules 46 are installed in the complete mix zone 28.

In operation, influent wastewater is typically admitted to the complete mix zone 28 at the front end of the system (although the complete mix system can be located elsewhere in one of the basins if desired). In a typical application, the wastewater is detained in the complete mix zone for approximately 1–2 days (up to 5 days in some applications), and in the remainder of the lagoon treatment system for 2–30 days. The process that is used is based on a design that provides sufficient sludge age for full nitrification, typically 40 to 50 days. The strength of the waste can create major variations in the detention times, but the sludge age or f/m ratio will be similar in all cases for proper operation of the process.

The wastewater in the complete mix zone 28 enters the settling modules 46 in which the solids in the wastewater are concentrated and returned to the bioreactor. The solids drop through the bottom 52 of each module 46 back into the complete mix bioreactor zone 28, and the action of the air diffusers 40 causes a complete mixing of the solids and recirculation throughout the volume of the complete mix zone 28. The modules 46 do not serve as clarifiers but instead act as concentration devices that maintain adequate biomass in the complete mix zone to assure sufficient bacteria to sustain the biological process. The modules 46 are designed to allow routine loss of excess solids along with the effluent into the subsequent polishing lagoons. In most applications, the complete mix zone is operated as a low rate, complete mix, activated sludge process with sludge age of 40 to 50 days.

As the system operates, the complete mix zone 28 reaches a biomass equilibrium condition, with the solids concentration at the equilibrium condition depending upon a number of factors, including detention time, the design and operation of the bioconcentration modules, temperature and organic load of the system. Normally, the MLSS level at equilibrium is between 1000 mg/l and 5000 mg/l to maintain proper sludge age. However, it may be desirable to operate some systems at elevated levels as high as 10,000 mg/l to obtain proper sludge age. Once equilibrium conditions have been reached, any excess solids pass through the settling modules and are eventually directed into zone 30 and the remaining zones 20 and 22 along with the effluent passing over the weir 56. In these zones, the wastewater is treated by a conventional lagoon process that may involve stabilization pond operation or partial mix lagoon aeration. In any event, the solids settle and are biologically stabilized in the lagoon and the treated effluent is eventually directed out of the treatment system as indicated by directional arrow 24 in FIG. 1. A principal advantage of upgrading the lagoon system in accordance with the present invention involves the ability to achieve advanced levels of treatment, i.e., nitrification and/or denitrification with minimum operator attention. The operation of the complete mix zone 28 as a low rate activated sludge process creates an f/m ratio that is typically in the range of about 0.05 to 0.30, which allows sufficient sludge age to accomplish full nitrification even in cold weather applications. This low rate nitrification typically has a sludge age of 40 to 50 days. The high biomass levels in the bioreactor zone combined with a relatively short detention time of 1–2 days in the complete mix zone 28, permits the necessary heat to be retained in the process to allow biological nitrification to occur.

The excess solids that are suspended in the wastewater effluent from the complete mix zone 28 are not managed but are instead freely discharged into the remainder of the lagoon where stabilization occurs either by means of a partial mix aerated lagoon process or a non-aerated stabilization pond process. The effluent from such a system can be expected to have a BOD level less than 20 mg/l, suspended solid levels less than 20 mg/l and nitrification adequate to convert ammonia to nitrate with the effluent nitrogen ammonia content being less than 1 mg/l. Additionally, the process of the present invention can be modified to achieve higher levels of treatment, including denitrification by adding a selector zone at the front end of the complete mix zone and recirculating MLSS through the selector zone or by bioaugmentation through feed of micro-organism cultures to enhance or supplement specific types of bacteria or other desirable organisms such as nitrification organism cultures.

The benefits of the present invention include use of an existing lagoon system with only modest upgrading costs, the ability to accomplish full nitrification even in cold climates, enhanced process flexibility, the ability for expansion to carry out denitrification, minimization of sludge handling and simplicity without the need for significant added training for operating personnel.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A method of treating wastewater in a lagoon separated into a plurality of treatment zones including a complete mix zone that is at least intermittently in a complete mix condition and has at least one open bottom bioconcentration chamber and a plurality of aerators, said method comprising the steps of:

directing influent wastewater into said complete mix zone and into said bioconcentration chamber to allow solids in the wastewater to concentrate therein and return to the complete mix zone by falling through said open bottom;

operating said aerators in a manner to aerate the wastewater and circulate the solids in said complete mix zone in a manner to effect complete mixing of the complete mix zone;

directing the wastewater through the remaining treatment zone or zones; and directing effluent out of the lagoon.

2. A method as set forth in claim 1, wherein the wastewater is detained in said complete mix zone for approximately 1–5 days.

3. A method as set forth in claim 1, wherein said aerators are suspended from a floating supply lateral pipe and said bioconcentration chamber is suspended from said lateral pipe.

4. A method as set forth in claim 1, wherein said complete mix zone has an f/m ratio in the range of approximately 0.05 to 0.30 and a sludge age of approximately 40 to 50 days.

5. A method as forth in claim 4, wherein the MLSS concentration in said complete mix zone is in the range of approximately 1000 mg/l to 10,000 mg/l.

6. A method as set forth in claim 1, wherein the MLSS concentration in said complete mix zone is in the range of approximately 1000 mg/l to 10,000 mg/l.

7. A method of treating wastewater in a lagoon, comprising the steps of:

separating the lagoon into a plurality of treatment zones, including at least one complete mix zone and at least one other zone in which the wastewater is not completely mixed;

directing influent wastewater into the lagoon and through said treatment zones;

installing in said complete mix zone a bioconcentration module providing a solids concentration chamber which has an open bottom and an inlet to admit wastewater and in which solids concentrate and drop through said open bottom back into said complete mix zone;

installing in said complete mix zone a plurality of aerators for aerating and mixing the wastewater therein and circulating the solids that return from said bioconcentration chamber in a manner to achieve biomass equilibrium in said complete mix zone; and directing effluent out of the lagoon.

8. A method as set forth in claim 7, wherein said step of installing aerators comprises installing a floating supply lateral in said complete mix zone and suspending said aerators from said lateral.

9. A method as set forth in claim 8, wherein said step of installing a bioconcentration module comprises suspending said module from said lateral.

10. A method as set forth in claim 7, including maintaining the f/m ratio in said complete mix zone in the range of approximately 0.05 to 0.30 and a sludge age of approximately 40 to 50 days.

11. A method as set forth in claim 10, including maintaining the MLSS concentration in said complete mix zone in the range of approximately 1000 mg/l to 10,000 mg/l.

12. A method as set forth in claim 11, wherein the detention time of the wastewater in said complete mix zone is approximately 1–5 days.

13. A method as set forth in claim 7, wherein the detention time of the wastewater in said complete mix zone is approximately 1–5 days.

14. A method as set forth in claim 7, including maintaining the MLSS concentration in said complete mix zone in the range of approximately 1000 mg/l to 10,000 mg/l.

* * * * *